United States Patent
Shambaugh

(10) Patent No.: US 9,056,534 B1
(45) Date of Patent: Jun. 16, 2015

(54) TIRE BEAD BREAKING ASSEMBLY

(71) Applicant: Tim L. Shambaugh, Lafayette, IL (US)

(72) Inventor: Tim L. Shambaugh, Lafayette, IL (US)

(*) Notice: Subject to any disclaimer, the term of this patent is extended or adjusted under 35 U.S.C. 154(b) by 158 days.

(21) Appl. No.: 13/732,874

(22) Filed: Jan. 2, 2013

(51) Int. Cl.
*B60C 25/13* (2006.01)
*B60C 25/02* (2006.01)

(52) U.S. Cl.
CPC ...................... *B60C 25/13* (2013.01)

(58) Field of Classification Search
CPC ...... B60C 25/00; B60C 25/125; B60C 25/135
USPC ........... 157/1, 1.1, 1.17, 1.2, 1.24, 1.26, 1.28, 157/14, 20
See application file for complete search history.

(56) References Cited

U.S. PATENT DOCUMENTS

| | | | |
|---|---|---|---|
| 465,392 A | 12/1891 | Shippee | |
| 2,749,975 A * | 6/1956 | Curtis | 157/1.26 |
| 2,760,563 A * | 8/1956 | Bishman | 157/1.26 |
| 2,901,029 A | 8/1959 | Mraz | |
| 3,033,268 A * | 5/1962 | Schaevitz | 157/1.26 |
| 4,121,644 A | 10/1978 | Boyle et al. | |
| 4,304,284 A | 12/1981 | Corkill et al. | |
| 4,676,291 A * | 6/1987 | Bolger | 157/1.17 |
| 4,759,395 A | 7/1988 | Tsukamoto | |
| 4,784,203 A * | 11/1988 | Weiden | 157/1.24 |
| 4,953,606 A | 9/1990 | Brown, Jr. | |
| 4,969,498 A | 11/1990 | Sheets | |
| 5,009,257 A * | 4/1991 | Reeves | 157/1.26 |
| 6,276,423 B1 * | 8/2001 | Goracy | 157/1.17 |
| 6,305,453 B1 * | 10/2001 | Zielewicz | 157/1.26 |

* cited by examiner

*Primary Examiner* — David B Thomas

(57) ABSTRACT

A tire bead breaking assembly includes a base that may abut a support surface. A wheel tower is coupled to the base so the wheel tower may retain an off road vehicle wheel. A primary mount is coupled to the base. A jack is coupled to the primary mount so the jack is positionable between an extended position and a retracted position. An arm tower is coupled to the base so the arm tower extends upwardly from the base. A primary arm is coupled to the jack so the arm tower provides a fulcrum for the primary arm. A secondary arm is coupled to the primary arm so the secondary arm selectively engages an off road vehicle tire when the jack is positioned in the extended position.

16 Claims, 6 Drawing Sheets

US 9,056,534 B1

TIRE BEAD BREAKING ASSEMBLY

BACKGROUND OF THE DISCLOSURE

Field of the Disclosure

The disclosure relates to tire bead breaking devices and more particularly pertains to a new tire bead breaking device for removing an off road vehicle tire from an off road vehicle wheel.

SUMMARY OF THE DISCLOSURE

An embodiment of the disclosure meets the needs presented above by generally comprising a base that may abut a support surface. A wheel tower is coupled to the base so the wheel tower may retain an off road vehicle wheel. A primary mount is coupled to the base. A jack is coupled to the primary mount so the jack is positionable between an extended position and a retracted position. An arm tower is coupled to the base so the arm tower extends upwardly from the base. A primary arm is coupled to the jack so the arm tower provides a fulcrum for the primary arm. A secondary arm is coupled to the primary arm so the secondary arm selectively engages an off road vehicle tire when the jack is positioned in the extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
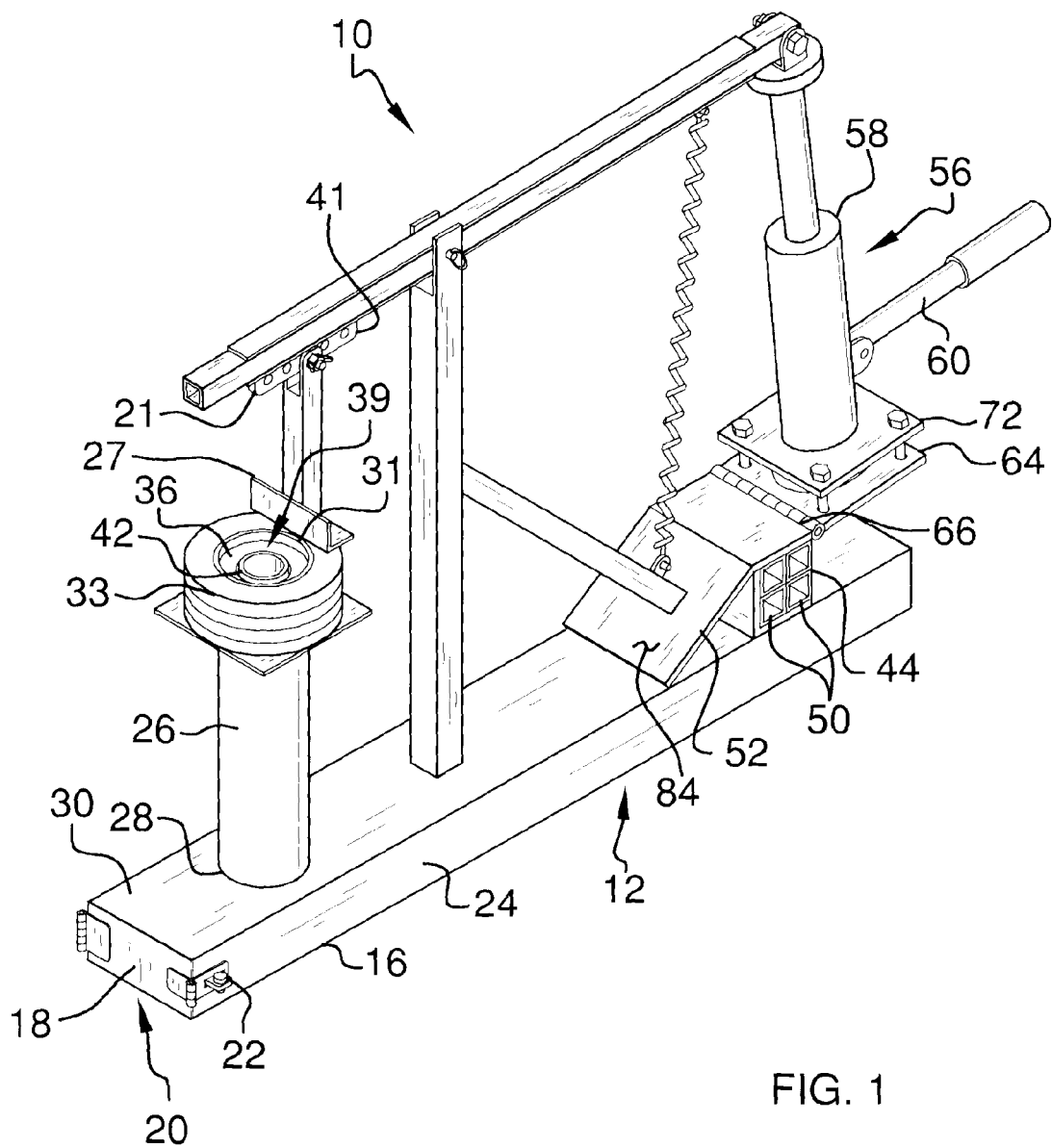
FIG. 1 is a perspective view of a tire bead breaking assembly according to an embodiment of the disclosure.
Figure 2:
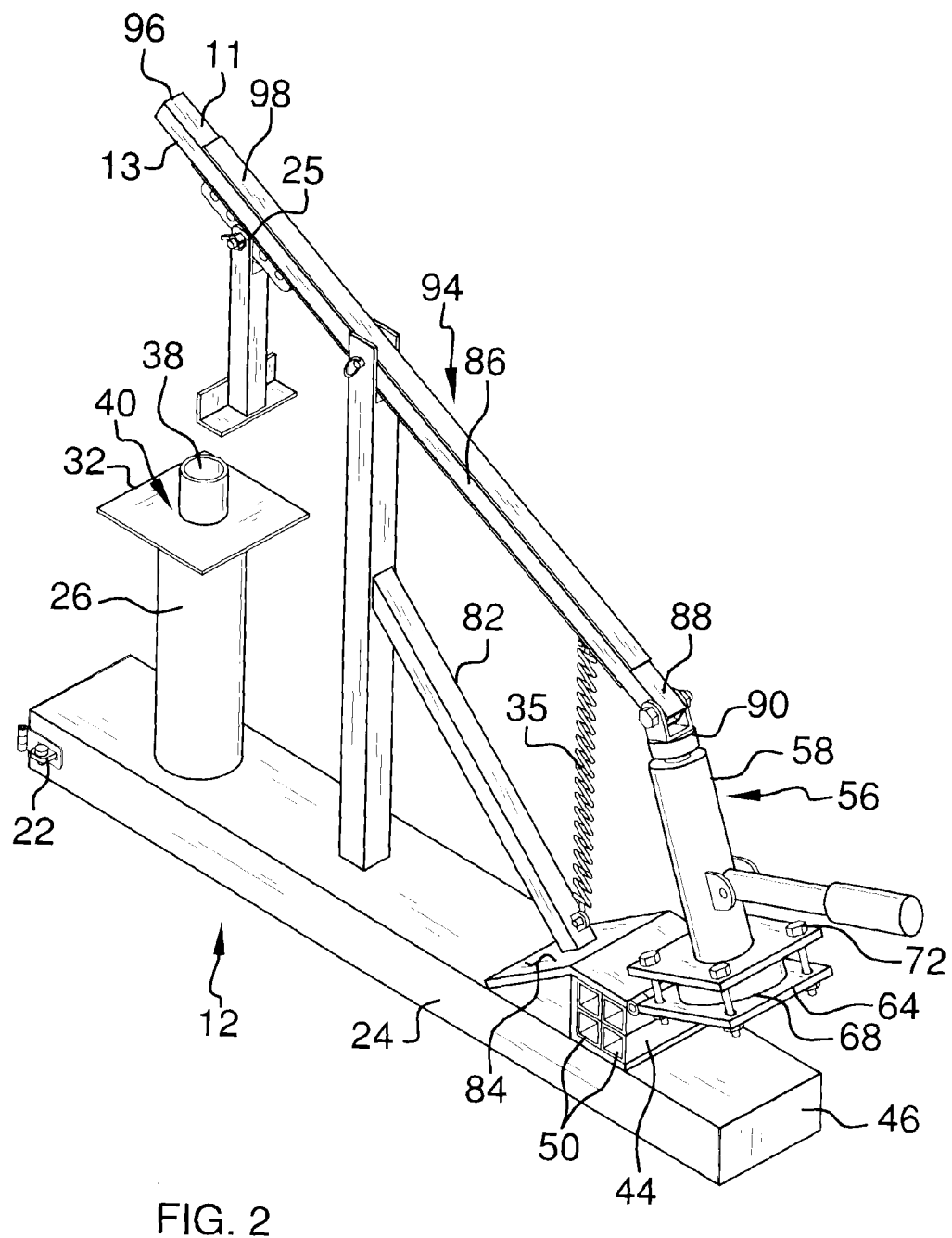
FIG. 2 is a back perspective view of an embodiment of the disclosure.
Figure 3:
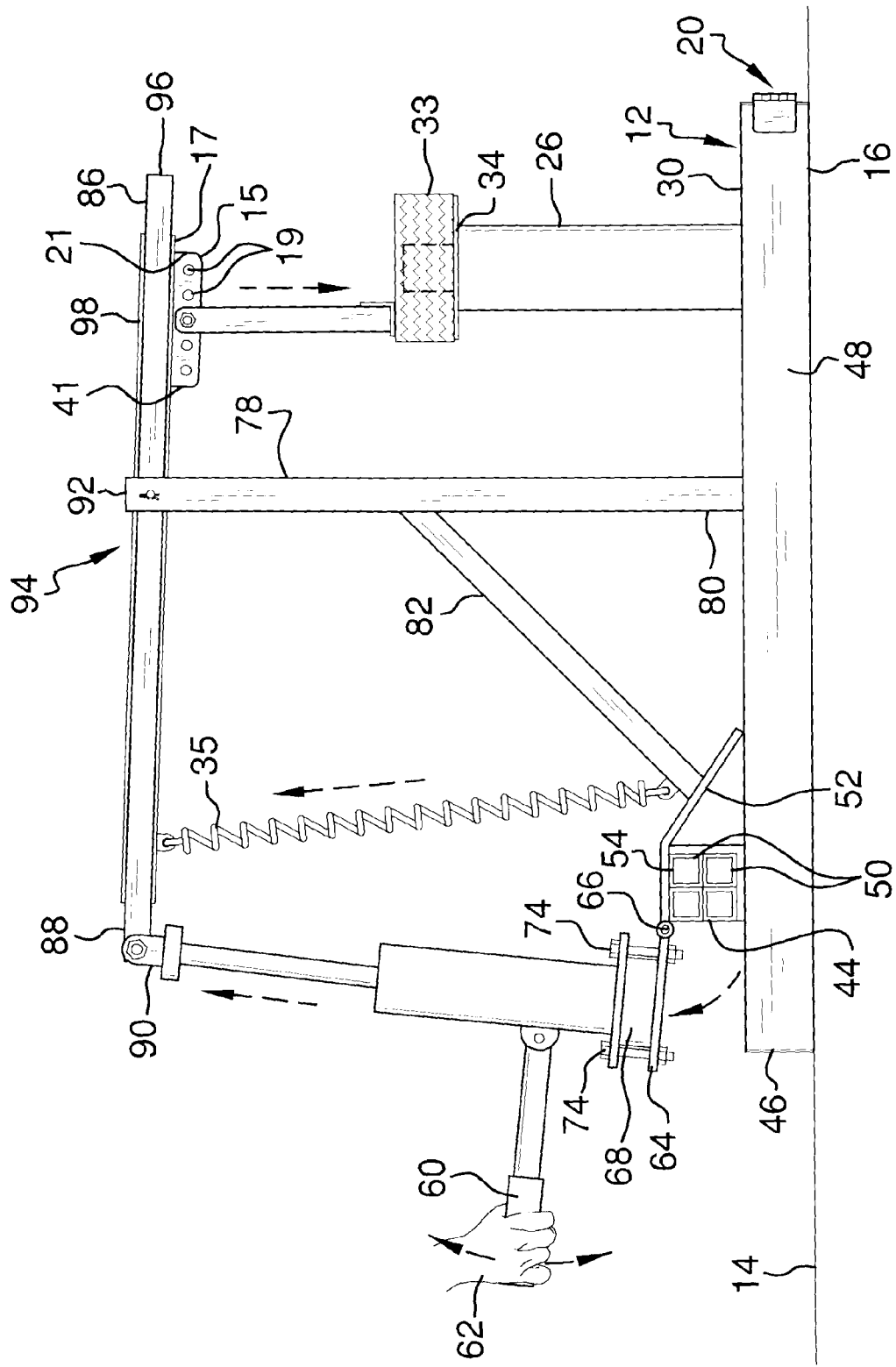
FIG. 3 is an in-use view of an embodiment of the disclosure.
Figure 4:
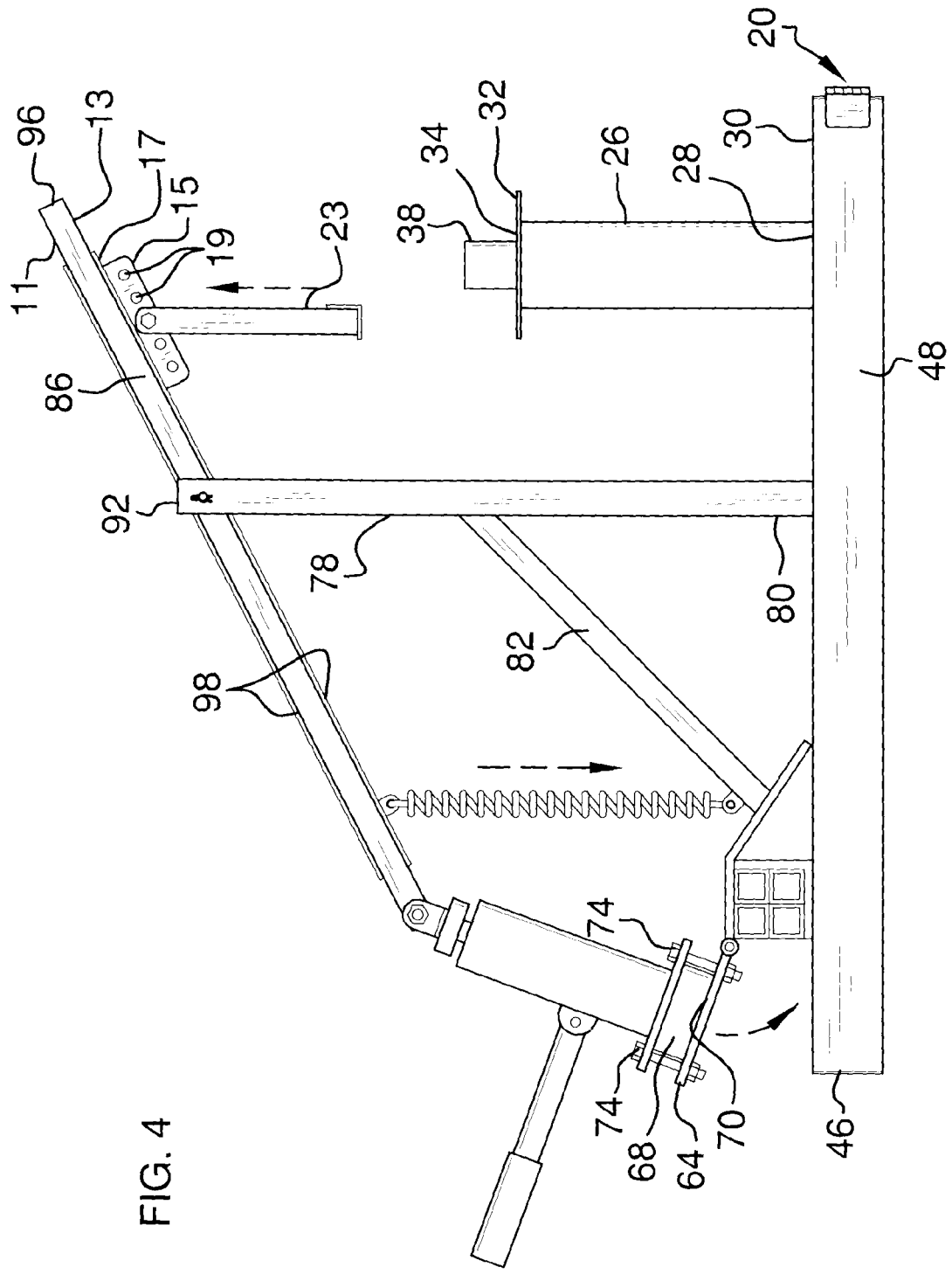
FIG. 4 is a left side view of an embodiment of the disclosure.
Figure 5:
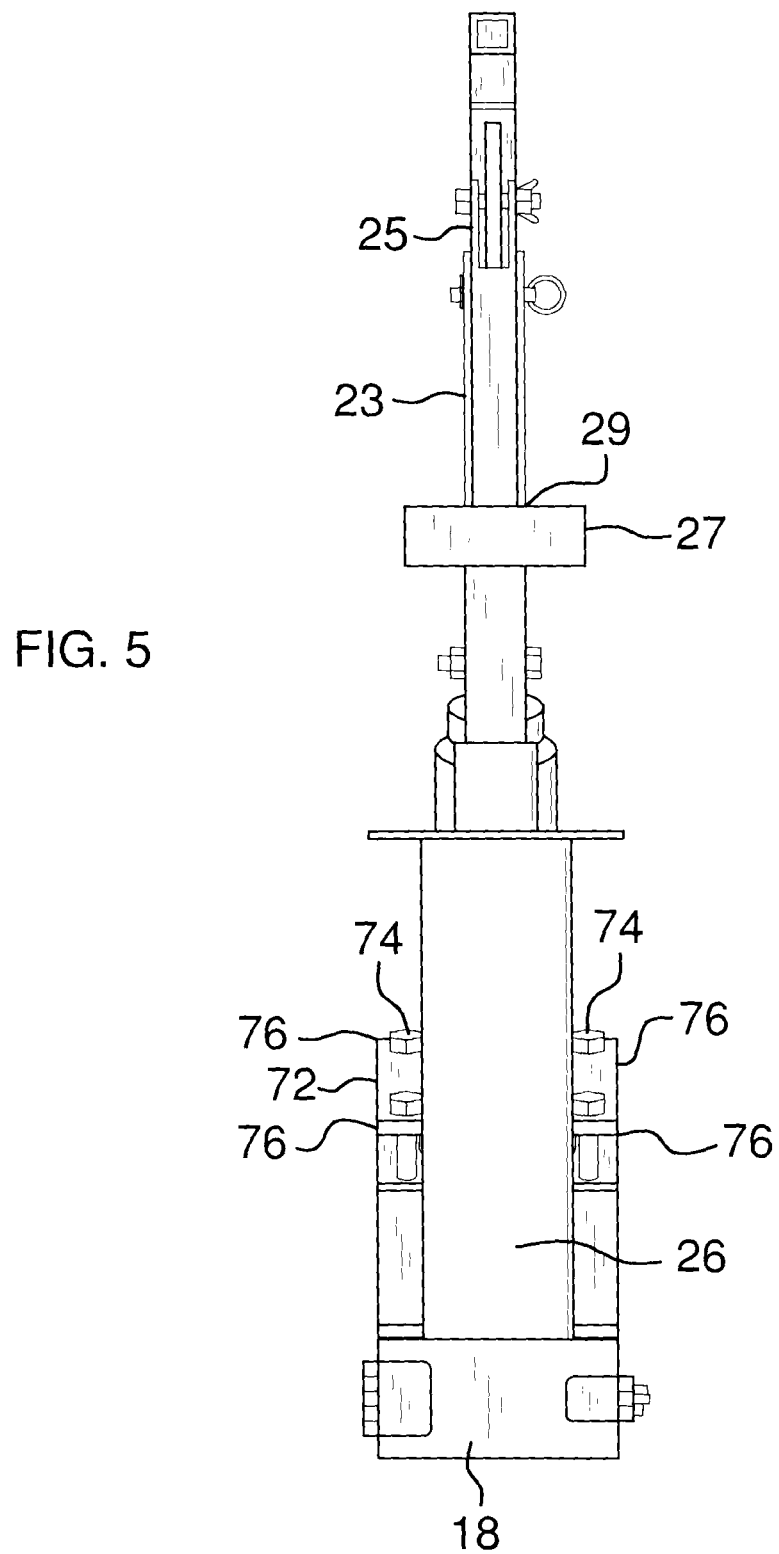
FIG. 5 is a front view of an embodiment of the disclosure.
Figure 6:
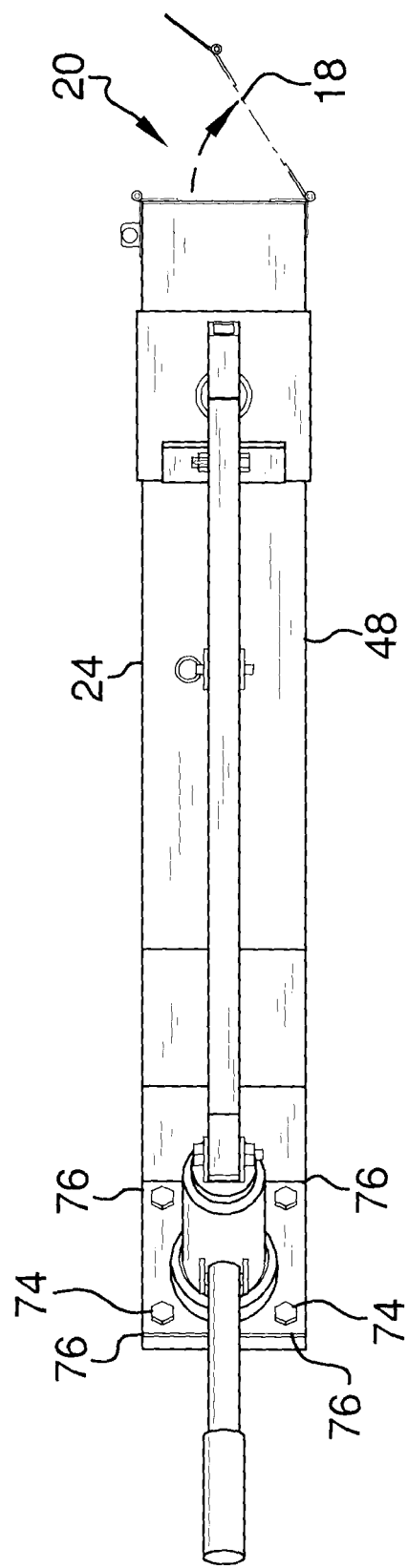
FIG. 6 is a top view of an embodiment of the disclosure.

With reference now to the drawings, and in particular to FIGS. 1 through 6 thereof, a new tire bead breaking device embodying the principles and concepts of an embodiment of the disclosure and generally designated by the reference numeral 10 will be described.

As best illustrated in FIGS. 1 through 6, the tire bead breaking assembly 10 generally comprises a base 12 that is positionable on a support surface 14 so a bottom 16 of the base 12 abuts the support surface 14. A door 18 is hingedly coupled to an open end 20 of the base 12 to access an interior of the base 12. A clasp 22 is coupled to a first lateral wall 24 of the base 12 proximate the open end 20 of the base 12. The clasp 22 selectively engages the door 18 to retain the door 18 in a closed position. The base 12 may have a length between 61 cm and 81 cm, a width between 7.5 cm and 13 cm and a height between 4 cm and 9 cm.

A wheel tower 26 comprises a bottom end 28 coupled to a top 30 of the base 12 proximate the open end 20 of the base 12. The wheel tower 26 may extend upwardly a distance between 20 cm and 30 cm from the top 30 of the base 12. Additionally, the wheel tower 26 may have tubular shape with a diameter between 5 cm and 8 cm. A wheel plate 32 is coupled to a top end 34 of the wheel tower 26 so the wheel plate 32 may support an off road vehicle wheel 36. The wheel plate 32 may have a length and width each being between 7 cm and 13 cm.

A wheel rod 38 is coupled to and may extend upwardly a distance between 7 cm and 11 cm from a center 40 of the wheel plate 32. The off road vehicle wheel 36 is selectively positionable on the wheel plate 32 so the wheel rod 38 extends through an opening 42 in the off road vehicle wheel 36. The wheel rod 38 retains the off road vehicle wheel 36 on the wheel plate 32. The off road vehicle wheel 36 may be a lawn mower wheel, an ATV wheel or other similar off road vehicle wheel 36.

A primary mount 44 is coupled to the top 30 of the base 12 proximate a closed end 46 of the base 12 so the primary mount 44 extends between the first lateral wall 24 and a second lateral wall 48 of the base 12. The primary mount 44 may have a height and a width between 7 cm and 13 cm. Additionally, the primary mount 44 may comprise a plurality of square tubes 50 oriented in a cube shape.

A plate 52 is coupled between a top 54 of the primary mount 44 and the top 30 of the base 12 so the plate 52 forms an acute interior angle with respect to the top 30 of the base 12. The plate 52 completely covers the top 54 of the primary mount 44. A jack 56 is movably coupled to the primary mount 44 so the jack 56 extends upwardly from the primary mount 44. The jack 56 is positionable between an extended position and a retracted position. Additionally, the jack 56 may be a hydraulic jack 58 of any conventional design. A lever 60 is coupled to the jack 56. The lever 60 is actuatable by a user 62 to position the jack 56 in the extended position.

A jack mount 64 is hingedly coupled to a rear edge 66 of the plate 52 so the jack mount 64 extends rearwardly from the plate 52. A bottom 68 of the jack 56 abuts a top surface 70 of the jack mount 64. A jack retainer 72 is positioned around the jack 56 proximate the bottom 68 of the jack 56 so the jack retainer 72 is spaced apart from the jack mount 64. A plurality of fasteners 74 each extends through an associated one of four corners 76 of the jack retainer 72. The plurality of fasteners 74 engages the jack mount 64 so the jack 56 is retained on the jack mount 64. The jack 56 is retained on the jack mount 64 so the jack 56 is hingedly coupled to the primary mount 44.

An arm tower 78 comprises a first end 80 coupled to the base 12 so the arm tower 78 extends upwardly from the base 12. The arm tower 78 may have a height between 43 cm and 51 cm. A support arm 82 is coupled between a top surface 84 of the plate 52 and the arm tower 78 so the support arm 82 retains the arm tower 78 in an upright position. The support arm 82 may have a length between 25 cm and 35 cm.

A primary arm 86 comprises a coupled end 88 movably coupled to a movable end 90 of the jack 56. A top end 92 of the arm tower 78 is movably coupled to the primary arm 86 proximate a center 94 of the primary arm 86 so the arm tower 78 provides a fulcrum for the primary arm 86. A free end 96 of the primary arm 86 is urged downwardly when the jack 56 is positioned in the extended position. The primary arm 86 may have a length between 51 cm and 71 cm. A pair of stiffening members 98 is coupled to an associated one of a top 11 and a bottom 13 of the primary arm 86. The pair of stiffening members 98 each extends between the coupled end 88 and the free end 96 of the primary arm 86 so the pair of stiffening members 98 increases the load bearing capacity of the primary arm 86.

An adjustment plate 15 is coupled to a bottom one of the pair of stiffening members 17 proximate the free end 96 of the primary arm 86. A plurality of fastener apertures 19 extends through the adjustment plate 15 so the plurality of fastener apertures 19 is evenly distributed between a front end 21 and a rear end 41 of the adjustment plate 15. A secondary arm 23 comprises a top end 25 movably coupled to the adjustment plate 15 so the secondary arm 23 extends downwardly from the primary arm 86. The secondary arm 23 may have a length between 7 cm and 13 cm.

A shoe 27 is coupled to a bottom end 29 of the secondary arm 23 so the shoe 27 forms an inverted T-shape with respect to the secondary arm 23. The shoe 27 selectively engages a bead 31 on an off road vehicle tire 33 when the jack 56 is positioned in the extended position so the off road vehicle tire 33 is removable from the off road vehicle wheel 36. The shoe 27 may have a length between 7 cm and 13 cm. A biasing member 35 is coupled between the primary arm 86 and the support arm 82 so the biasing member 35 biases the jack 56 toward the retracted position. The biasing member 35 may comprise a spring 37 of any conventional design.

In use, the user 62 positions the off road vehicle wheel 36 on the wheel rod 38. The user 62 actuates the lever 60 so the jack 56 moves toward the extended position. As the jack 56 moves into the extended position the primary arm 86 urges the secondary arm 23 downwardly toward the off road vehicle tire 33. The shoe 27 abuts the bead 31 on the off road vehicle tire 33 and urges the bead 31 downwardly from a top 39 of the off road vehicle wheel 36. The off road vehicle tire 33 is removable from the off road vehicle wheel 36 after the bead 31 is separated from the top 39 of the off road vehicle wheel 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tire bead breaking assembly for off road vehicles, said assembly comprising:
   a base configured to abut a support surface;
   a wheel tower coupled to said base wherein said wheel tower is configured to retain an off road vehicle wheel;
   a primary mount coupled to said base;
   a jack coupled to said primary mount wherein said jack is positionable between an extended position and a retracted position;
   an arm tower coupled to said base wherein said arm tower extends upwardly from said base;
   a primary arm coupled to said jack wherein said arm tower provides a fulcrum for said primary arm;
   a secondary arm coupled to said primary arm wherein said secondary arm selectively engages an off road vehicle tire when said jack is positioned in said extended position; and
   a plate coupled between a top of said primary mount and a top of said base wherein said plate forms an acute interior angle with respect to said top of said base.

2. The assembly according to claim 1, further comprising said base being positionable on the support surface wherein a bottom of said base abuts the support surface.

3. The assembly according to claim 1, further comprising said wheel tower comprising a bottom end of said wheel tower coupled to a top of said base proximate an open end of said base wherein said wheel tower extends upwardly from said top of said base.

4. The assembly according to claim 3, further comprising a wheel plate coupled to a top end of said wheel tower wherein said wheel plate supports the off road vehicle wheel.

5. The assembly according to claim 4, further comprising:
   a wheel rod coupled to and extending upwardly from a center of said wheel plate; and
   the off road vehicle wheel being selectively positionable on said wheel plate wherein said wheel rod extends through an opening in the off road vehicle wheel wherein the off road vehicle wheel is retained on said wheel plate.

6. The assembly according to claim 1, further comprising said primary mount being coupled to a top of said base proximate a closed end of said base.

7. The assembly according to claim 1, further comprising a coupled end of said primary arm being movably coupled to a movable end of said jack wherein a top end of said arm tower is movably coupled to said primary arm proximate a center of said primary arm.

8. The assembly according to claim 1, further comprising a shoe coupled to a bottom end of said secondary arm wherein said shoe selectively engages a bead on the off road vehicle tire when said jack is positioned in said extended position wherein the off road vehicle tire is removable from the off road vehicle wheel.

9. A tire bead breaking assembly for off road vehicles, said assembly comprising:
   a base configured to abut a support surface;
   a wheel tower coupled to said base wherein said wheel tower is configured to retain an off road vehicle wheel;
   a primary mount coupled to said base;
   a jack coupled to said primary mount wherein said jack is positionable between an extended position and a retracted position;
   an arm tower coupled to said base wherein said arm tower extends upwardly from said base;
   a primary arm coupled to said jack wherein said arm tower provides a fulcrum for said primary arm;
   a secondary arm coupled to said primary arm wherein said secondary arm selectively engages an off road vehicle tire when said jack is positioned in said extended position; and
   a support arm coupled between a top surface of a plate and said arm tower wherein said support arm retains said arm tower in a upright position.

10. A tire bead breaking assembly for off road vehicles, said assembly comprising:
    a base configured to abut a support surface;

a wheel tower coupled to said base wherein said wheel tower is configured to retain an off road vehicle wheel;

a primary mount coupled to said base;

a jack coupled to said primary mount wherein said jack is positionable between an extended position and a retracted position;

an arm tower coupled to said base wherein said arm tower extends upwardly from said base;

a primary arm coupled to said jack wherein said arm tower provides a fulcrum for said primary arm;

a secondary arm coupled to said primary arm wherein said secondary arm selectively engages an off road vehicle tire when said jack is positioned in said extended position; and a jack mount hingedly coupled to a rear edge of a plate wherein said jack mount extends rearwardly from said plate.

11. A tire bead breaking assembly for off road vehicles, said assembly comprising:

a base configured to abut a support surface;

a wheel tower coupled to said base wherein said wheel tower is configured to retain an off road vehicle wheel;

a primary mount coupled to said base;

a jack coupled to said primary mount wherein said jack is positionable between an extended position and a retracted position;

an arm tower coupled to said base wherein said arm tower extends upwardly from said base;

a primary arm coupled to said jack wherein said arm tower provides a fulcrum for said primary arm;

a secondary arm coupled to said primary arm wherein said secondary arm selectively engages an off road vehicle tire when said jack is positioned in said extended position; and a jack retainer positioned on a bottom of said jack wherein said jack retainer is spaced apart from a jack mount.

12. The assembly according to claim 11, further comprising a plurality of fasteners each extending through an associated one of four corners of said jack retainer wherein said plurality of fasteners engages said jack mount wherein said jack is hingedly coupled to said primary mount.

13. A tire bead breaking assembly for off road vehicles, said assembly comprising:

a base configured to abut a support surface;

a wheel tower coupled to said base wherein said wheel tower is configured to retain an off road vehicle wheel;

a primary mount coupled to said base;

a jack coupled to said primary mount wherein said jack is positionable between an extended position and a retracted position;

an arm tower coupled to said base wherein said arm tower extends upwardly from said base;

a primary arm coupled to said jack wherein said arm tower provides a fulcrum for said primary arm;

a secondary arm coupled to said primary arm wherein said secondary arm selectively engages an off road vehicle tire when said jack is positioned in said extended position;

an adjustment plate coupled to a bottom of said primary arm proximate a free end of said primary arm; and a plurality of fastener apertures extending through said adjustment plate wherein said plurality of fastener apertures is evenly distributed between a front end and a rear end of said adjustment plate.

14. A tire bead breaking assembly for off road vehicles, said assembly comprising:

a base configured to abut a support surface;

a wheel tower coupled to said base wherein said wheel tower is configured to retain an off road vehicle wheel;

a primary mount coupled to said base;

a jack coupled to said primary mount wherein said jack is positionable between an extended position and a retracted position;

an arm tower coupled to said base wherein said arm tower extends upwardly from said base;

a primary arm coupled to said jack wherein said arm tower provides a fulcrum for said primary arm;

a secondary arm coupled to said primary arm wherein said secondary arm selectively engages an off road vehicle tire when said jack is positioned in said extended position; and a top end of said secondary arm being movably coupled to an adjustment plate wherein said secondary arm extends downwardly from said primary arm.

15. A tire bead breaking assembly for off road vehicles, said assembly comprising:

a base configured to abut a support surface;

a wheel tower coupled to said base wherein said wheel tower is configured to retain an off road vehicle wheel;

a primary mount coupled to said base;

a jack coupled to said primary mount wherein said jack is positionable between an extended position and a retracted position;

an arm tower coupled to said base wherein said arm tower extends upwardly from said base;

a primary arm coupled to said jack wherein said arm tower provides a fulcrum for said primary arm;

a secondary arm coupled to said primary arm wherein said secondary arm selectively engages an off road vehicle tire when said jack is positioned in said extended position; and a biasing member coupled between said primary arm and a support arm wherein said biasing member biases said jack toward said retracted position.

16. A tire bead breaking assembly for off road vehicles, said assembly comprising:

a base being positionable on a support surface wherein a bottom of said base abuts the support surface;

a wheel tower comprising a bottom end coupled to a top of said base proximate an open end of said base wherein said wheel tower extends upwardly from said top of said base;

a wheel plate coupled to a top end of said wheel tower wherein said wheel plate supports an off road vehicle wheel;

a wheel rod coupled to and extending upwardly from a center of said wheel plate, the off road vehicle wheel being selectively positionable on said wheel plate wherein said wheel rod extends through an opening in the off road vehicle wheel wherein the off road vehicle wheel is retained on said wheel plate;

a primary mount coupled to said top of said base proximate a closed end of said base;

a plate coupled between a top of said primary mount and said top of said base wherein said plate forms an acute interior angle with respect to said top of said base;

a jack movably coupled to said primary mount wherein said jack is positionable between an extended position and a retracted position;

a jack mount hingedly coupled to a rear edge of said plate wherein said jack mount extends rearwardly from said plate;

a jack retainer positioned on a bottom of said jack wherein said jack retainer is spaced apart from said jack mount;

a plurality of fasteners each extending through an associated one of four corners of said jack retainer wherein said plurality of fasteners engages said jack mount wherein said jack is hingedly coupled to said primary mount;

an arm tower comprising a first end coupled to said base wherein said arm tower extends upwardly from said base;

a support arm coupled between a top surface of said plate and said arm tower wherein said support arm retains said arm tower in a upright position;

a primary arm comprising a coupled end movably coupled to a movable end of said jack wherein a top end of said arm tower is movably coupled to said primary arm proximate a center of said primary arm wherein said arm tower provides a fulcrum for said primary arm;

an adjustment plate coupled to a bottom of said primary arm proximate a free end of said primary arm;

a plurality of fastener apertures extending through said adjustment plate wherein said plurality of fastener apertures is evenly distributed between a front end and a rear end of said adjustment plate;

a secondary arm comprising a top end movably coupled to said adjustment plate wherein said secondary arm extends downwardly from said primary arm;

a shoe coupled to a bottom end of said secondary arm wherein said shoe selectively engages a bead on the off road vehicle tire when said jack is positioned in said extended position wherein the off road vehicle tire is removable from the off road vehicle wheel; and a biasing member coupled between said primary arm and said support arm wherein said biasing member biases said jack toward said retracted position.

\* \* \* \* \*